April 1, 1958     S. A. MURDOCK ET AL     2,829,066
ANTISTATIC COPOLYMER OF SULFONATED STYRENE
AND VINYL-PYRIDINE AND TREATMENT THEREWITH
OF SYNTHETIC SHAPED ARTICLES
Filed May 4, 1956
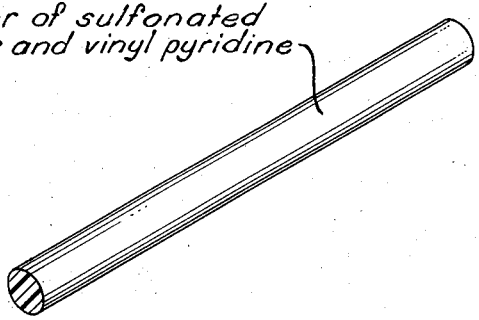
Synthetic hydrophobic fiber treated with antistatic copolymer of sulfonated styrene and vinyl pyridine
INVENTORS.
Stanley A. Murdock
Teddy G. Traylor
Theodore B. Lefferdink
BY *Griswold & Burdick*
ATTORNEYS

United States Patent Office 2,829,066
Patented Apr. 1, 1958

2,829,066

ANTISTATIC COPOLYMER OF SULFONATED STYRENE AND VINYL-PYRIDINE AND TREATMENT THEREWITH OF SYNTHETIC SHAPED ARTICLES

Stanley A. Murdock, Teddy G. Traylor, and Theodore B. Lefferdink, Concord, Calif., assignors to The Dow Chemical Company, Midland, Mich., a corporation of Delaware Application May 4, 1956, Serial No. 582,802

30 Claims. (Cl. 117—7)

This invention relates to a method for treating shaped articles comprised of synthetic hydrophobic polymeric materials, particularly those that may be comprised of polymers and copolymers of acrylonitrile, so as to overcome their propensity for accumulating static electrical charges. It also has reference to the articles resulting from such a treatment and to the novel and improved antistatic agents that are employed therein.

Polyacrylonitrile and various copolymers of acrylonitrile with other monoethylenically unsaturated monomeric materials, especially those containing at least about 80 percent by weight of acrylonitrile polymerized in the copolymer molecule, have many attractive properties which make them desirable for employment in various shaped articles including fibers, filaments, yarns, threads (and cloth and fabrics constructed therefrom), ribbons, tapes, foils, films, sheets and the like. Shaped articles from polymers and copolymers of acrylonitrile, however, as well as those from many other synthetic hydrophobic polymeric materials including polyamides such as the nylons and polyesters such as polyethylene terephthalate and the like, exhibit an inordinate capacity for accumulating surface charges of static electricity. This characteristic makes them extremely difficult and unwieldy to manipulate and handle during various manufacturing operations and use applications. It also lessens their attractiveness in other aspects for being employed for many purposes. For example, many individuals may object to the delitescent electrical shocks they may be subject to or the sparks that may be discharged when they serve as the effective grounding means for articles comprised of polymers and copolymers of acrylonitrile and other synthetic hydrophobic polymeric materials when there is a considerable accumulation of electrical charges on the articles. Furthermore, electrostatically charged articles comprised of polymers and copolymers of acrylonitrile and other synthetic hydrophobic polymeric materials display great tendencies to collect dust and dirt and to have undesirably high degrees of soil retentivity. This, of course, limits their adaptability for being utilized in a completely satisfactory manner for many apparel, upholstery, home furnishing, decorative and other uses.

Innumerable materials, treatments and techniques have been proposed, suggested and advanced to overcome or minimize the problems of static electrical charge accumulations on articles comprised of synthetic hydrophobic polymeric materials, particularly polymers and copolymers of acrylonitrile, which hereinafter will be predominantly illustrated with acrylonitrile polymer fibers, which may be referred to as acrylic fibers by way of characterizing their polymeric or copolymeric origin. The known treatments are generally defective or deficient in various particulars. Thus, many materials and finishes intended for application as antistatic agents are not sufficiently substantive for or adherescent on articles comprised of polymers and copolymers of acrylonitrile or other synthetic hydrophobic polymeric materials so that it may be difficult to suitably apply them to such articles and to realize satisfactory or substantial degrees of permanence after their application. Such features may be particularly pronounced for materials which contain various sulfonic groups. Unfortunately, the typical sulfonic group-containing materials (which frequently have exceptional effectiveness as antistatic agents) have great water solubility. This renders them easily susceptible to removal during aqueous manufacturing treatments or subsequent laundering or dry cleaning of the synthetic fiber articles on which they may be applied. Furthermore, some antistatic agents have an undesirable influence on the hand or feel to the touch of the textile materials with which they are utilized. In addition, a great number of the known antistatic materials require that complex procedures be practiced for their application. The cost of their utilization may be significantly amplified thereby. It would be advantageous to provide an improved and more beneficial antistatic agent and treatment for acrylic fibers and for fibers comprised of other synthetic hydrophobic polymeric materials.

Therefore, it is among the principal objects of the present invention to provide a method for treating articles comprised of synthetic hydrophobic polymeric materials, particularly polymers and copolymers of acrylonitrile, to improve their resistivity for developing or accumulating static electrical charges.

It is also among the principal objects of the present invention to provide an improved and novel water-insoluble antistatic agent that will remain in effective association with acrylic fibers and fibers from other synthetic hydrophobic polymeric materials after its application despite repeated and rigorous subjection to aqueous treatments, washings, laundering and dry cleaning.

It is among the additional objects of the invention to provide articles comprised of synthetic hydrophobic polymeric materials, particularly polymers and copolymers of acrylonitrile, including fibers and the like and cloth and fabrics constructed therefrom, which result from such a treatment.

It is a predominating objective of the present invention to accomplish these intendments without detraction from or deletion of the other desirable characteristics and properties of acrylic and other fibers and other related articles comprised of synthetic hydrophobic polymeric materials, particularly polymers and copolymers of acrylonitrile.

Still further objects, advantages and benefits of the invention will be apparent in the following description and specification.

According to the invention, shaped articles comprised of synthetic hydrophobic polymeric materials, particularly polymers and copolymers of acrylonitrile, may be rendered less propense to accumulate static electrical charges by treating them with an application of an antistatic agent comprised of a copolymer of a sulfonated styrene monomeric material and a vinyl pyridine compound. Advantageously, the antistatic agent can be applied during the manufacturing operations in the course of preparing an acrylic or other synthetic fiber. Articles treated in accordance with the present invention, one of which is illustrated in the accompanying drawing, retain the antistatic sulfonated styrene-vinyl pyridine copolymer in a substantially permanent manner throughout normal usage of the material. They have excellent antistatic properties and may be handled and employed readily without difficulties due to accumulations of static electricity. Furthermore, articles in accordance with the present invention retain their essential characteristics, including hand, and have an undiminished receptivity for other desired treatments which may be calculated and intended to enhance other of their properties, including dye-receptivity. The sulfonated styrene-vinyl pyridine copolymer which may beneficially be employed as an antistatic agent does not engender adverse consequences in this regard.

The copolymeric antistatic agent of the invention may advantageously be comprised of styrene sulfonic acid copolymerized with vinyl pyridine. If desired, however, various salts of the styrene sulfonic acid including the sodium and potassium salts thereof may be employed in place of the free acid. Likewise, various substituted vinyl pyridines may be copolymerized with the sulfonated styrene monomeric material in the same manner as vinyl pyridine. When substituted vinyl pyridines are employed, it is ordinarily advantageous to utilize those which may be represented by the following general formula:

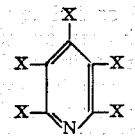

wherein one X is a vinyl radical and the remainder are independently selected from the group consisting of hydrogen atoms and lower alkyl groups that contain from 1 to 3 carbon atoms. 2-vinyl pyridine and 4-methyl-2-vinyl pyridine may be copolymerized with the sulfonated styrene monomer with particular advantage in the practice of the invention. It is ordinarily desirable to employ copolymers that contain between about 25 and 75 percent by weight of the sulfonated styrene monomeric material polymerized in the copolymer molecule. It may frequently be more advantageous to employ copolymers that have about equimolar proportions of the sulfonated styrene monomeric material and the vinyl pyridine compound copolymerized therein.

The antistatic copolymer may be prepared in accordance with conventional polymerization techniques. Thus, about equimolar proportions (or other desired ratios) of the monomeric ingredients may be polymerized at temperatures between about 30 and 60° C. within periods of several hours with the assistance of a suitable polymerization catalyst such as hydrogen peroxide. The copolymerized mass which is generally obtained from the polymerization of a sulfonated styrene monomer with a vinyl pyridine compound is a viscid, water-insoluble material that is soluble in concentrated hydrochloric acid, particularly when it is between about a 6 and 12 normal concentration.

Various techniques may be utilized for preparing suitable applicating compositions of the antistatic copolymer. Usually it is advantageous to apply it from a liquid dispersion using water or some other inert medium as a dispersant vehicle. Such a dispersion may be directly prepared by polymerizing the copolymer, with agitation, in the presence of a dispersant vehicle and an emulsifying agent in order to provide an immediately usable composition. Advantageously, however, the applicating composition may be prepared by neutralizing a solution of the copolymer in concentrated hydrochloric acid with an alkali metal hydroxide to form very fine particles of the antistatic copolymer in aqueous dispersion. More advantageously, such a technique may be utilized first to purify the copolymer mass then, upon redissolution of the initially precipitated mass in concentration hydrochloric acid and subsequent neutralization of the solution, for formation of the applicating composition. It is usually beneficial to employ a dispersing agent in applicating compositions prepared by the neutralization of acid solutions. An octyl alcohol sulfate, such as that which is available under the trade-name "Dupanol 80" from E. I. du Pont de Nemours & Co., Inc., is especially desirable for such purposes.

It is advantageous for the applicating composition to contain between about 0.5 and 20 percent by weight of the antistatic copolymer. For many purposes it is even more advantageous for the antistatic applicating composition to contain between about 1 and 5 percent by weight of the copolymer. The composition of the antistatic copolymer may be applied in any desired manner. Thus, in the manner of conventional textile finish application, it may be applied directly to a running strand of the acrylic or other synthetic fiber or other shaped article using a liquid jet or spray of the composition. If desired, applicating rollers and equivalent devices may be utilized for the purpose. It may frequently be more convenient, however, especially when fiber articles are being treated, to employ the applicating composition as an impregnating bath in whch the synthetic fiber article, during any stage of its manufacture or subsequent thereto, is immersed in order to pick up a desired quantity of the antistatic copolymer. Cloth and fabric may also be treated in this manner, if desired.

The applicating composition may be employed with especial advantage as an impregnating bath wherein some other treatment, such as an orientation by stretching, is being performed in the course of manufacture of the fiber or other shaped article. In such cases, the impregnating bath may often be used with greater benefit at elevated temperatures. Thus, the application, especially in combination with other manufacturing treatments such as orientation by stretching, may be performed at temperatures as high as in the neighborhood of 100° C. The antistatic copolymer is dried on the acrylic or other synthetic fiber or other shaped article after its application. The drying of a treated fiber or other product may, of course, be accomplished in the normal manner when application of the antistatic copolymer has been made during the course of its manufacture.

Any desired amount of the antistatic copolymer may be employed on the acrylic or other synthetic fiber or other shaped article. Usually, it is beneficial to apply an amount between about 0.5 and 5.0 percent by weight of the antistatic copolymer, based on the dry weight of the article. In many cases it may be more advantageous for the amount that is used to be between about 1.0 and 2.0 percent by weight.

The invention will be further illustrated in and by the following examples wherein, unless otherwise indicated, all parts and percentages are to be taken by weight:

*Example I*

About 8 parts of the sodium salt of p-styrene sulfonic acid, 7 parts of 2-vinyl pyridine and 0.6 part of an aqueous 5 percent solution of hydrogen peroxide were combined in about 200 parts of water. The pH of the solution was adjusted to about 3.0 before it was placed in a pressure vessel to be agitated in a tumbling bath for about 4 hours while being maintained at a temperature of about 60° C. The copolymerized product was obtained in a sticky, water-insoluble mass. The copolymerized product was dissolved in about 10.5 parts of 6 N hydrochloric acid and precipitated therefrom with a neutralizing quantity of sodium hydroxide to form an aqueous dispersion which was maintained with the assistance of about 3.8 parts of "Dupanol 80." The applicating composition formed in this manner was used with excellent results in the antistatic treatment of fibers comprised essentially of polyacrylonitrile and was equally adapted for similar employment with fibers from other synthetic hydrophobic polymeric materials.

*Example II*

A mixture consisting of about 110 parts of a 0.356 molar aqueous solution of p-styrene sulfonic acid, 4.02 parts of 2-vinyl pyridine and 0.07 part of an aqueous 5 percent solution of hydrogen peroxide was flushed with carbon dioxide and sealed in a pressure vessel polymerizer. The vessel was then tumbled for about 12 hours while being maintained at a temperature of about 50° C.

An insoluble, sticky, polymerized mass was obtained. The copolymerized mass so obtained was dissolved in about 10.5 parts of 6 N hydrochloric acid and reprecipitated by neutralization of the solution with sodium hydroxide. The precipitated copolymer was isolated by filtration from the aqueous medium. After being washed in water and dried, the copolymer was found to contain about 54 percent of the styrene sulfonic acid polymerized in the copolymer molecule.

The purified copolymer was then redissolved in 6 N hydrochloric acid to form about 455 grams of a solution containing about 8.8 percent of dissolved copolymer. About 150 grams of "Dupanol 80" was then added to the solution. The solution, containing the dispersing agent, was added to about 2,500 grams of distilled water and adjusted so as to have a pH of about 5 with a sufficient quantity of a 10 percent aqueous solution of sodium hydroxide. Water was then added to make a total volume of about 4 liters. A yellow-green dispersion of the extremely discrete copolymeric particles was obtained. The dispersion was then employed as an impregnating bath for the antistatic copolymer on a 300 filament tow of polyacrylonitrile aquagel fibers which had been wet spun from an aqueous zinc chloride spinning solution into an aqueous zinc chloride coagulating bath; washed substantially free from zinc chloride; and preliminarily stretched to a length about 6 times its original length (600 percent) while being immersed in an aqueous solution at a temperature of 100° C. The already stretched fiber was further stretched about 225 percent while being passed with about a 4.5 second residence through the aqueous copolymer dispersion which was also maintained at a temperature of about 100° C. for the purpose. The resulting 3 denier fiber, designated Sample A, was dried at 150° C. for 7 minutes and found to have picked up about 1.9 percent, based on its dry weight, of the styrene sulfonic acid-vinyl pyridine antistatic copolymer in the second impregnating bath.

The treated fiber was then vat dyed with Brilliant Cibanone Green BF and subjected to ten accelerated wash tests in accordance with that specified for A. A. T. C. C. Test No. 3A. The antistatic value of Sample A was then tested with a "miniature card" static test device which simulated the action of conventional textile carding apparatus and permitted an electrostatic determination to be made of the quantity of static electricity thereby accumulated on the fibers. Sample A, when tested at a temperature of about 80° F. with about 46 percent relative humidity was found to have accumulated an amount of static electricity which was only about 0.0091 times that of a scoured wool sample which had also been tested for static in the miniature card under identical conditions.

For purposes of comparison, another polyacrylonitrile fiber (Sample B) was prepared, dyed and tested in an identical manner to Sample A with the exception that the second bath during the hot stretching operation did not contain the aqueous dispersion of the styrene sulfonic acid-vinyl pyridine copolymer. Sample B, after identical analysis with the miiniature card, was found to have accumulated more than 3 times the amount of static electricity that was obtained with the scoured wool and more than 330 times the accumulation evidenced by Sample A.

*Example III*

A polyacrylonitrile aquagel fiber which had been oriented by stretching was passed through a similar styrene sulfonic acid-vinyl pyridine copolymer dispersion as was employed in Example II excepting that the aqueous, dispersed applicating composition of the copolymer was maintained at room temperature. The residence time of the fiber in the impregnating bath was about 4.5 seconds. After impregnation with about 0.95 percent of the antistatic copolymer, based on the dry fiber weight, the treated fiber (Sample C) was dried at 150° C. for about 7 minutes. A similar oriented, polyacrylonitrile aquagel fiber (Sample D) was also dried without being treated with the antistatic copolymer. Both samples were vat dyed with Brilliant Cibanone Green BF and subjected to ten A. A. T. C. C. No. 3A wash tests. They were then tested for their propensity to accumulate electrostatic charges at 46 percent relative humidity and 80° F. using the miniature card tester described in the preceding example. A scoured wool sample was also tested for purposes of comparison. The results obtained were as follows:

| Sample No. | Ratio: Static Reading of Sample/Static Reading of Wool |
|---|---|
| C | 0.049 |
| D | 3.0+ |

As is apparent, the treated, destaticed fiber had excellent antistatic characteristics, greatly superior to scoured wool, even after severe washing.

*Example IV*

An immediately employable applicating composition of copolymeric antistatic agent in accordance with the invention was prepared by charging to a suitable pressure vessel about 5.8 grams of p-styrene sulfonic acid in 6 percent aqueous solution, about 0.15 gram of 2-vinyl pyridine, about 0.15 gram of a 0.5 percent aqueous solution of hydrogen peroxide, about 6.3 grams of a 1 percent aqueous solution of an emulsifying agent consisting of dioctyl sodium sulfosuccinate, similar to that which may be obtained from American Cyanamid Co. under the trade-name "Aerosol OT," and about 188 grams of water; flushing the charged vessel with carbon dioxide; and copolymerizing the monomers with constant agitation for 24 hours at a temperature of about 60° C. The amount of charged monomeric material, as is apparent, was about 0.25 percent of the reaction mass using about 25 percent of the emulsifying agent and 0.1 percent of the catalyst, based on the weight of the monomeric material. About a 7:3 weight ratio of p-styrene sulfonic acid to 2-vinyl pyridine was employed.

After the polymerization was terminated, a milky white emulsion of the copolymer was obtained. The copolymer, upon analysis, was found to contain about 62 percent by weight of the styrene sulfonic acid polymerized in the copolymer molecule.

The thereby obtained copolymer emulsion was applied to a oriented, polyacrylonitrile fiber in aquagel form by soaking the fiber in the emulsion for about 10 minutes at room temperature, squeezing the fiber to remove excess emulsion, and drying the treated fiber for about 7 minutes at 150° C. The treated fiber had a white color and a good hand. It was found to contain about 0.75 percent of the antistatic copolymer, based on the weight of the dry fiber.

The fiber sample was tested for antistatic value at a temperature of about 80° F. and a relative humidity of 45 percent using the miniature card procedure set forth in the preceding examples. The test was performed both before and after a 15 minute scour at the boil in an aqueous solution containing about 0.5 percent of a non-ionic detergent material. The results obtained are given below.

| Sample | Ratio: Static Reading of Sample/Static Reading of Scoured Wool |
|---|---|
| Before Scour | 0.41 |
| After Scour | 0.71 |

Similar excellent results may be obtained when antistatic copolymers of styrene sulfonic acid and its salts are prepared with 4-methyl-2-vinyl pyridine and with other lower alkyl substituted derivatives of vinyl pyridine and when there are analogous antistatic treatments made on other shaped acrylic and other synthetic polymeric articles, including films and cloth and fabrics made from acrylic fibers and from other synthetic hydrophobic polymeric materials including, in particular, polyamide and polyester fibers.

Various changes in the practice of this invention may readily be made without substantially departing from its spirit or scope. It is to be understood, therefore, that all the foregoing be interpreted as being merely illustrative and in no sense or manner limiting or restrictive of the invention as it is particularly pointed out and defined in the appended claims.

What is claimed is:

1. Antistatic treatment for a shaped article comprised of a synthetic hydrophobic polymeric material which comprises applying to the shaped article a copolymer of a sulfonated styrene monomeric material and a vinyl pyridine compound.

2. The treatment of claim 1 wherein the shaped article is comprised of an acrylonitrile polymer.

3. The treatment of claim 1, wherein the copolymer is comprised of styrene sulfonic acid and a vinyl pyridine compound.

4. The treatment of claim 1, wherein the copolymer is comprised of an alkali metal salt of styrene sulfonic acid and a vinyl pyridine compound.

5. The treatment of claim 1, wherein the copolymer is comprised of a sulfonated styrene monomeric material and an alkyl substituted vinyl pyridine in which the substituent alkyl groups contain from 1 to 3 carbon atoms.

6. The treatment of claim 1, wherein the copolymer is comprised of a sulfonated styrene monomeric material and 2-vinyl pyridine.

7. The treatment of claim 1, wherein between about 0.5 and 5 percent by weight of the copolymer is applied to the shaped article, based on the weight of the shaped article.

8. The treatment of claim 1, wherein between about 1.0 and 2.0 percent by weight of the copolymer is applied to the shaped article, based on the weight of the shaped article.

9. In the treatment of claim 1, applying the copolymer from a liquid dispersion that contains between about 0.5 and 20 percent by weight of the copolymer in a finely divided form.

10. In the treatment of claim 1, applying the copolymer from a liquid dispersion that contains between about 1 and 5 percent by weight of the copolymer in a finely divided form.

11. The treatment of claim 1, and including the steps of applying the copolymer from a liquid dispersion and subsequently drying the shaped article after application of the copolymer.

12. The treatment of claim 1, wherein the shaped article is comprised of an acrylonitrile polymer in aquagel form and including the steps of applying the copolymer from a liquid dispersion by immersing the shaped article therein and subsequently drying the shaped article after application of the copolymer.

13. The treatment of claim 1, wherein the shaped article is comprised of an acrylic fiber in aquagel form and including the steps of applying the copolymer from a liquid dispersion by immersing the fiber therein and subsequently drying the fiber after application of the copolymer.

14. A treatment in accordance with the treatment set forth in claim 13 wherein the copolymer is applied from a liquid dispersion at a temperature in the neighborhood of 100° C. while said fiber is being oriented by being stretched therein.

15. A shaped article comprising a synthetic hydrophobic polymeric material which is characterized in being substantially free from propensity to accumulate static electrical charges, said article having a copolymer of a sulfonated styrene monomeric material and a vinyl pyridine compound applied thereto as an antistatic agent.

16. The article of claim 15, wherein the antistatic copolymer contains between about 25 and 75 percent by weight of the sulfonated styrene monomeric material polymerized in the copolymer molecule.

17. The article of claim 15, wherein the antistatic copolymer is comprised of about equimolar proportions of the sulfonated styrene monomeric material and the vinyl pyridine compound.

18. The article of claim 15, wherein the antistatic copolymer is comprised of styrene sulfonic acid copolymerized with 2-vinyl pyridine.

19. The article of claim 15, wherein between about 0.5 and 5.0 percent by weight of the antistatic copolymer is applied thereto, based on the dry weight of the shaped article.

20. The article of claim 15, wherein between about 1.0 and 2.0 percent by weight of the antistatic copolymer is applied thereto, based on the dry weight of the shaped article.

21. The article of claim 15, wherein the synthetic hydrophobic polymeric material is comprised of a polymer of acrylonitrile that contains at least about 80 percent by weight of acrylonitrile polymerized in the polymer molecule.

22. A polyacrylonitrile fiber article in accordance with claim 15.

23. A polyamide fiber article in accordance with claim 15.

24. A polyester fiber article in accordance with claim 15.

25. A copolymer of a sulfonated styrene monomeric material and a vinyl pyridine compound.

26. The copolymer of claim 25, wherein the sulfonated styrene monomeric material is styrene sulfonic acid.

27. The copolymer of claim 25, wherein the sulfonated styrene monomeric material is an alkali metal salt of styrene sulfonic acid.

28. The copolymer of claim 25, wherein the vinyl pyridine compound has the general formula:

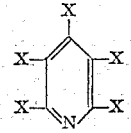

wherein one X is a vinyl radical and the remainder are independently selected from the group consisting of hydrogen atoms and lower alkyl groups that contain from 1 to 3 carbon atoms.

29. The copolymer of claim 25 containing between about 25 and 75 percent by weight of the sulfonated styrene monomeric material polymerized in the copolymer molecule.

30. The copolymer of claim 25 comprised of about equimolar proportions of the sulfonated styrene monomeric material and the vinyl pyridine compound.

References Cited in the file of this patent

UNITED STATES PATENTS 2,700,001    Cohen et al.            Jan. 18, 1955
2,717,887    Saner                 Sept. 13, 1955